N. Ames.
Indicator.

No. 2,860. Reissued Feb. 11, 1868.

Witnesses.
L. A. Ames
David A. Ames.

Inventor.
N. Ames.

N. PETERS, PHOTO-LITHOGRAPHER, WASHINGTON, D. C.

UNITED STATES PATENT OFFICE.

E. M. MONTAGUE, OF BOSTON, ASSIGNEE OF NATHAN AMES, OF SAUGUS CENTRE, MASSACHUSETTS.

INDEX DOOR-PLATE.

Specification forming part of Letters Patent No. 29,430, dated July 31, 1860; Reissue No. 2,860, dated February 11, 1868.

*To all whom it may concern:*

Be it known that NATHAN AMES, of Saugus Centre, State of Massachusetts, has invented new and useful Improvements in Index Door-Plates; and that the following is a full and exact description of the same, reference being had to the drawings that accompany and form a part of this specification, in which—

Figure 2:
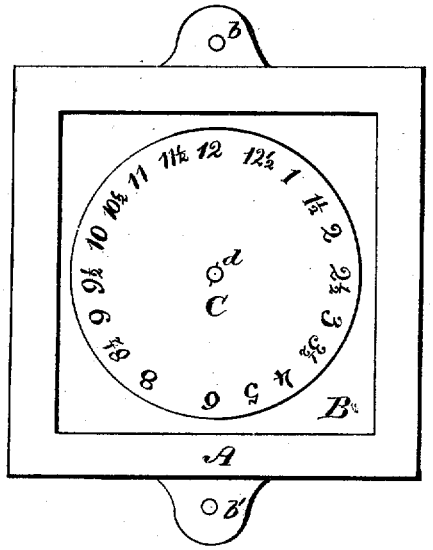
Figure 1:
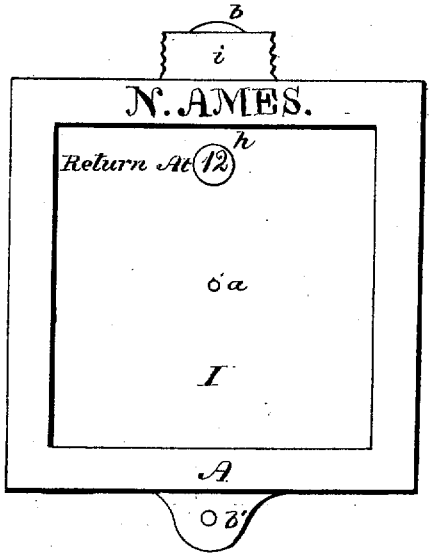
Figure 4:
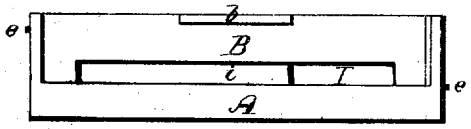
Figure 3:
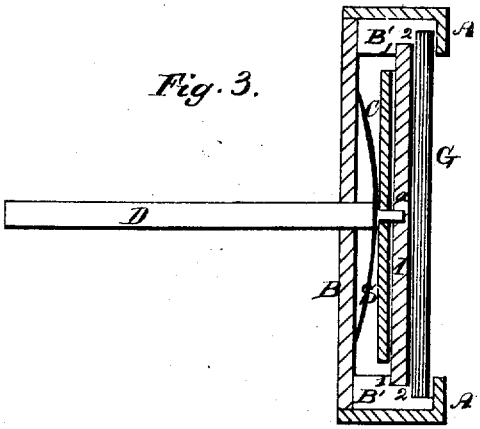

Figure 1 is a front view; Fig. 2, a similar view with the plate I removed; Fig. 3, a horizontal section; Fig. 4, a top view, showing the slot for receiving the plate I.

The nature of this invention consists, first, in the use of a removable tablet, on which any message or information may be written and easily expunged, and so arranged and combined with the other parts as not to be removed or interfered with by any meddlesome party outside the door; second, in combination with the above, the use of a plate or disk, on which may be marked such hours and parts of hours as it may be desirable to exhibit, and providing the same with the support or spindle D, by which the disk C is easily adjusted to display any desired figure, yet not accessible save to the occupant of the room on the inside; third, in the use of the spring S, to answer the double purpose, operating through the spindle D, of preventing any one from the outside removing the plate or tablet I and holding in position the disk or plate C.

In structure, the device is a suitable case or frame, one-half inch or so in thickness, and three or four inches across, square or circular, of metal or wood, or any other suitable material, containing the disk C, the tablet I, the spindle D, the spring S, and the front glass, G, each adapted and arranged to serve as follows: The frame A and B sustains and keeps the other parts, as the drawings fully illustrate, and is attached to the door on the outside by the flanges *b b'*, or in any other suitable manner. The spindle D passes through the door within, and extends far enough to be worked by the hand.

In the view of the case the spring S is placed as illustrated in Fig. 3, and is held securely on the spindle D. Just in front of the spring S is the disk C, indicating on its face the hours and parts of hours of the day desired. In front of this is placed the removable tablet I, made to slide into place from one side of the frame A B, provided with an opening, *a*, into which the end of the spindle D is forced by the spring S, and provided also with an opening or slot, *h*, through which any particular time indicated on the disk C may be seen by a person standing without the door.

The glass G protects the interior parts, and allows any one without to see what hour is indicated by the figures in view on the disk C, and also to read what may be written on the tablet I.

Near the opening *h* may be placed the words, "Return at——," "Open at——," or any other suitable words.

The disk C may be of paper or pasteboard, and the figures printed thereon, or of sheet metal, and the figures printed, painted, or stamped thereon; or it may be made of glass or any other suitable material, and the arrangement of the figures be in a circle or otherwise.

If a person, on leaving the room to the entering-door of which the plate is attached, desires to have it known to callers when he will return, he has only to turn the spindle D so that the hour required is seen at *h*. If he wishes to leave a short notice or direction, stating where he has gone, where he may be found, what he wishes to have done, or anything of the kind, he can relieve plate I by drawing back spindle D, and, withdrawing it, (I,) can write what he wishes thereon with a pencil, and when the tablet or plate is replaced the writing cannot be defaced, changed, or taken away by any meddlesome person without.

What I claim in this invention, and desire to secure by Letters Patent, is—

1. The use, in a door-plate, of a tablet or slate and an adjustable plate or disk having figures or readable signs or characters, for the purposes specified and set forth.

2. In combination with the above door-plate, a rotating disk, C, marked with the hours and parts of an hour, as shown in Fig. 2, said disk being confined in the center to a spindle, D, which passes through the door, substantially as and for the purpose described.

3. The spring S, arranged, combined, and operating substantially as described.

E. M. MONTAGUE.

Witnesses:
G. W. PALMER,
D. C. COLBY.